J. CORRIGAN.
FLEXIBLE RIM VEHICLE WHEEL.
APPLICATION FILED NOV. 5, 1907.
931,999.
Patented Aug. 24, 1909.
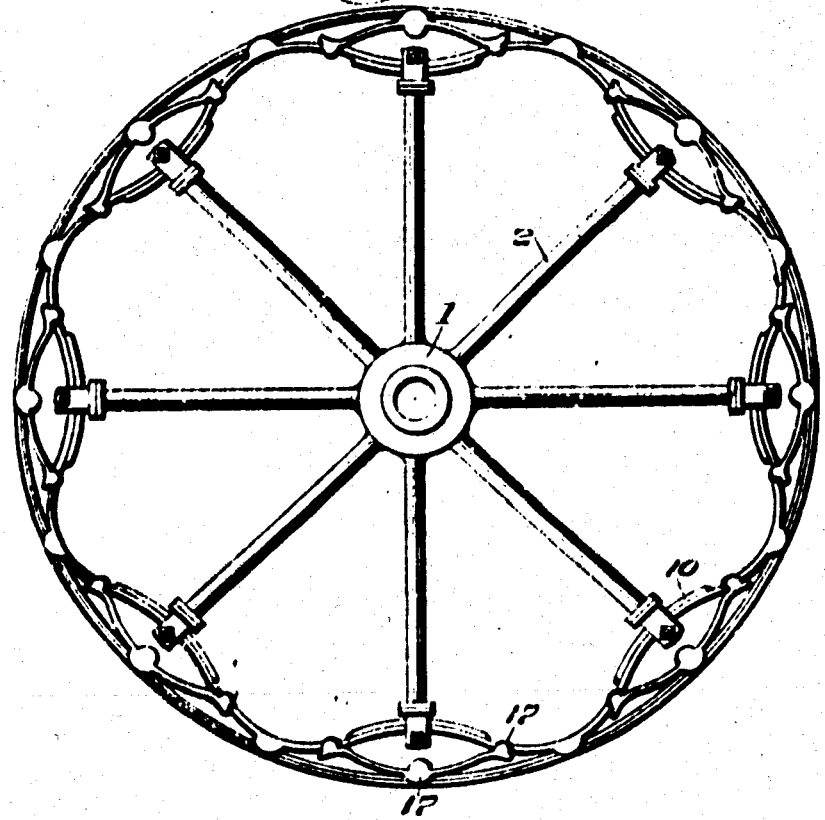
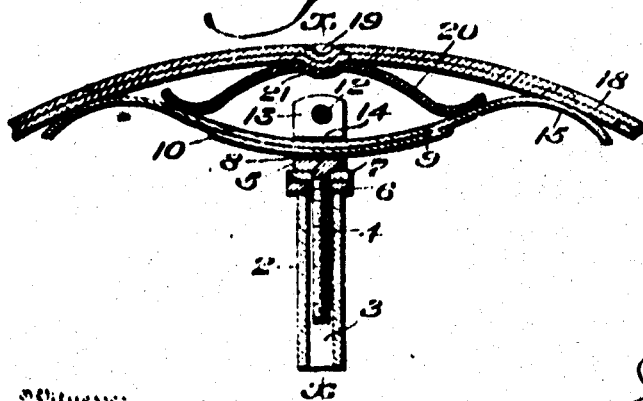
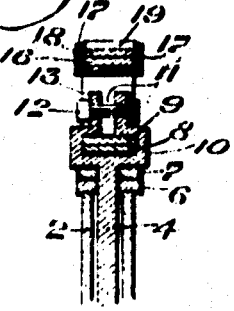
Inventor
Joseph Corrigan

UNITED STATES PATENT OFFICE.

JOSEPH CORRIGAN, OF ROCKLEDGE, PENNSYLVANIA, ASSIGNOR OF ONE-THIRD TO PETER CRAMP AND ONE-THIRD TO DAVID M. THOMSON, BOTH OF ROCKLEDGE, PENNSYLVANIA.

FLEXIBLE-RIM VEHICLE-WHEEL.

931,999.  Specification of Letters Patent.  Patented Aug. 24, 1909.

Application filed November 5, 1907. Serial No. 400,838.

*To all whom it may concern:*

Be it known that I, JOSEPH CORRIGAN, a citizen of the United States, residing at Rockledge, county of Montgomery, State of Pennsylvania, have invented a new and useful Flexible-Rim Vehicle-Wheel, of which the following is a specification.

My present invention consists of a novel construction of a flexible rim vehicle wheel in which the hubs and the spokes are rigid and in which novel means is interposed between the spokes and the rim for securing the parts in assembled position and at the same time permitting the yielding movement of the rim at certain times.

It further consists of a novel construction of a vehicle wheel in which a flexible rim is employed, which may be covered with a layer of leather, rubber or other resilient material, if desired.

It further consists of a novel construction in which a flexible rim is employed, between which and the spokes is interposed a plurality of spring members, said members being maintained in position by means of a novel fastening device carried by the spokes and movable therein.

It further consists of novel means for regulating the tension of the springs against the rim member.

It further consists of a novel construction of a vehicle wheel in which the rim is flexible and is deflected inwardly at intervals in order to interlock at certain places with a spring member, against which latter bears a second spring member, said second spring member being secured to tension members movably mounted in the spokes and provided with means for regulating the tension of the springs.

It further consists of other novel features of construction, all as will be hereinafter fully set forth.

In order to illustrate my invention, I have preferred to show an embodiment thereof which has been found in actual practice to give satisfactory and reliable results, although it is to be understood that the various instrumentalities of which my invention consists can be variously arranged and organized and that my invention is not limited to the precise arrangement and organization of these instrumentalities as herein shown.

Figure 1 represents, in side elevation, a vehicle wheel embodying my invention. Fig. 2 represents a sectional view of a portion of Fig. 1. Fig. 3 represents a section on line *x—x*, Fig. 2.

Similar numerals of reference indicate corresponding parts in the figures.

Referring to the drawings, 1 designates the hub to which spokes 2 are secured in any suitable manner, said spokes being hollow or provided at their ends with the apertures 3 in which the threaded extension 4 of a tension regulating member 5 is adapted to be seated, said member 5 being provided with an adjusting nut 6 and a lock nut 7, whereby the distance to which said threaded rod 4 may extend into the aperture 3 may be limited as desired.

The member 5 is provided with an aperture 8 therethrough in which the spring 9 is adapted to be seated, a spring or other member 10 being also employed to increase the strength of the member 9. The member 5 is slotted at its upper end as indicated at 11 and a bolt 12 passes through the flanges 13 whereby the members 9 and 10 are rigidly secured to the member 5, it being understood that owing to the manner in which the member 5 is slotted, as at 11, there is a certain amount of resiliency in the flanges 13 so that when the same are drawn together by means of the bolt 12 which is provided with a suitable end, said members 9 and 10 will be firmly secured in assembled position. In the present instance I have preferred to show a single spring 9 as being employed, although it will be understood that this may be formed of a plurality of springs and still be within the scope of my invention and that the same will act in the same manner as a single spring, which I have herein shown.

The spring 9 curves inwardly at regular points as indicated at 14 and curves outwardly as indicated at 15, at which point it engages the inner rim member 16 and at such point is provided with the ears or lugs 17 which extend outwardly and form guides for said member. An outer flexible rim member 18 is also preferably employed in order to stiffen and reinforce the rim 16 without destroying any of the resilient effect. The rim members 16 and 18 are deflected inwardly as indicated at 19 in order that at said points they will be seated in each other, forming interlocking means. Another spring member 20 is provided between the rim member 16 and the spring 9 as an additional shock absorbing means. This means also has the ear pieces or lugs 17 which serve to retain it in position by engaging the sides of the rim pieces 16 and 18. At its central portion is formed an interlocking depression 21 adapted to engage the rim at projection 19.

From the above description, the operation of the invention is clear, the flexible rim bending inward and taking up the first impact with the ground or an obstacle thereon communicating it to the interlocked spring and from there to the spring on the spokes where the shock is practically eliminated.
Furthermore, skidding of the vehicle in rounding corners or the like is prevented by the increased amount of friction surface.

It will now be apparent that I have devised a novel and useful construction of flexible rim wheel which embodies the features of advantage enumerated as desirable in the statement of invention and the above description and while I have, in the present instance, shown and described a preferred embodiment thereof which gives in practice satisfactory and reliable results, it is to be understood that the same is susceptible of modification in various particulars without departing from the spirit and scope of the invention or sacrificing any of its advantages.

Having thus described my invention, what I claim as new and desire to secure by Letters Patent, is:—

1. In a wheel, a hub, spokes therefor, a flexible rim, a spring connecting said spokes and rim, a series of springs interposed between said rim and first mentioned spring, and interlocking means on said rim coöperating with each spring of the series.

2. In a wheel, a hub, spokes therefor, a flexible rim, a spring connecting said spokes and rim, lugs on said spring coöperating with said rim, a series of springs interposed between said rim and first mentioned spring, and interlocking means on said rim coöperating with each spring of the series.

3. In a wheel, a hub, spokes therefor, a plurality of members forming a flexible rim, a spring secured to said spokes and contacting at intervals with said rim, and means for positioning said rim and spring and permitting relative movement therebetween.

4. In a wheel, a hub, spokes therefor, a plurality of members forming a flexible rim, a spring encircled by said members, said spring being detachably connected to said spokes and contacting at intervals with said rim, and guiding means for said spring and rim at said points of contact, permitting relative movement between said rim and spring.

5. In a wheel, a hub, spokes therefor, a plurality of members forming a flexible rim, a spring encircled by said rim and contacting at intervals therewith, detachable connections between said spring and spokes, guiding means for said spring and rim to permit relative movement therebetween, and a series of springs intermediate of said points of contact coöperating with said rim and first mentioned spring.

JOSEPH CORRIGAN.

Witnesses:
DAVID M. THOMSON,
PETER CRAMP.